Nov. 3, 1953 — J. A. PALCER — 2,657,805
Y TYPE STRAINER
Filed May 21, 1949
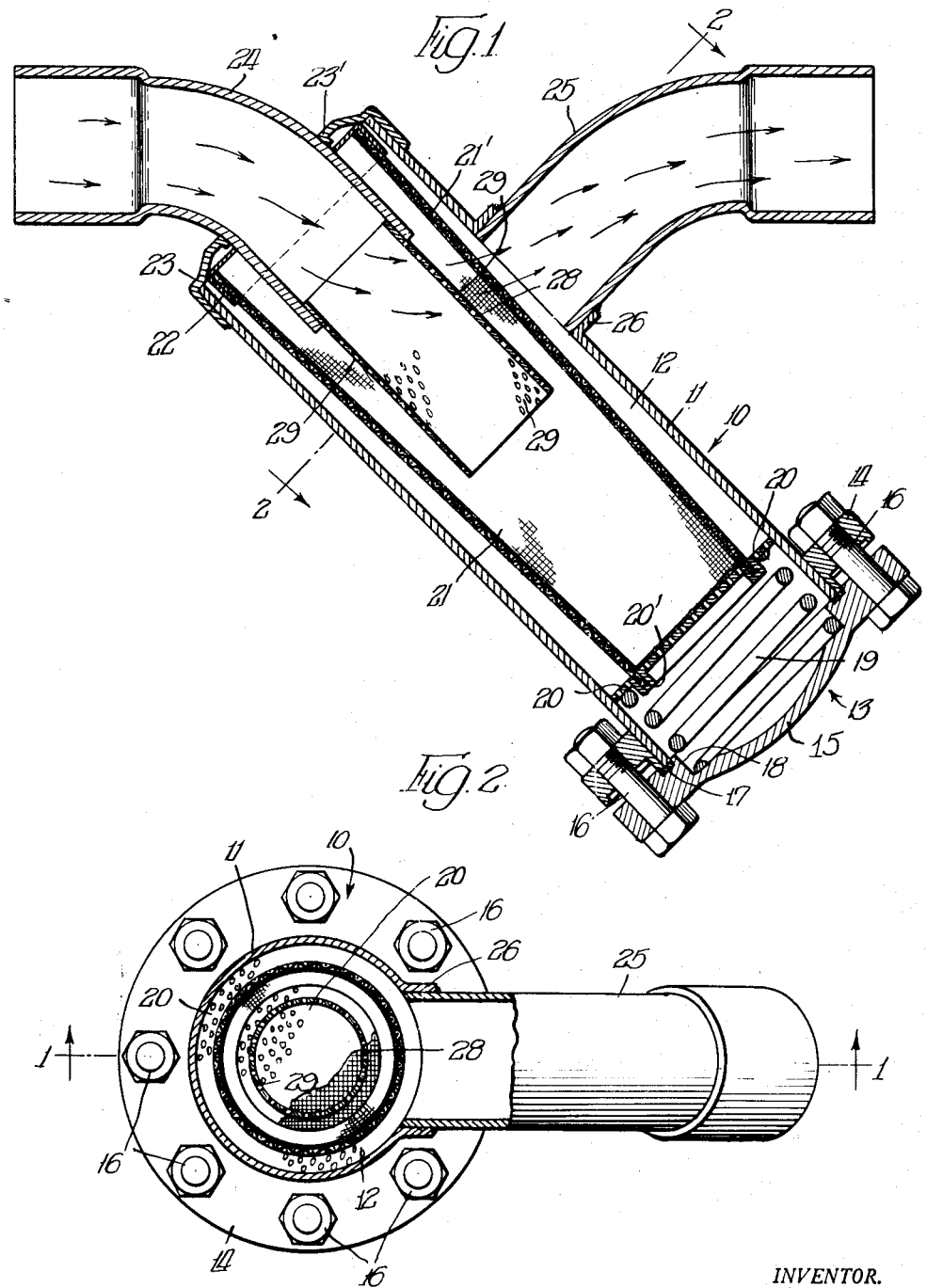
INVENTOR.
Joseph A. Palcer,
BY
Cromwell, Greist & Warden
ATTYS.

Patented Nov. 3, 1953

2,657,805

UNITED STATES PATENT OFFICE 2,657,805

Y-TYPE STRAINER

Joseph A. Palcer, Chicago, Ill., assignor to Henry Valve Company, Incorporated, Chicago, Ill., a corporation of Illinois Application May 21, 1949, Serial No. 94,555

1 Claim. (Cl. 210—164)

This invention relates to an improved and highly simplified strainer of the sort commonly referred to as the Y type, the function of which is to strain impurities, suspended material, foreign matter, and like agents from a flowing body of liquid or other circulating fluid. The present application is a continuation in part of my copending application, Serial No. 57,981, filed November 2, 1948, now abandoned.

In the manufacture of strainers of the foregoing type, it has heretofore been the custom to assemble and secure together a pair of separate, tubular metallic elements of suitable diameter, cylindrical in section, in the general outline of the letter Y, thereby to constitute a forked strainer casing. Strainer bodies of this type are well known in the art. The procedure in manufacturing the same has been to provide an elongated oval opening in the side wall of one of said elements, as by milling the same, to cut away one end and side of the other element at an angle to the tubular axis, thereby to provide a gradually tapered forward edge defining an elongated oval opening at the tube end, and finally to assemble and secure said tubular elements together in Y-outline with said cutaway end edge coincident with the oval outline of the aforesaid first named milled opening. The two tubes are usually soldered together in this forked, Y-shaped outline. A sleeve-like, mesh or foraminated strainer is then disposed in thus assembled strainer body or casing coaxially of one of said elements, together with an inlet fitting mounted to discharge axially into said strainer screen. Accordingly, fluid entering said inlet fitting passes through the mesh or foraminated screen wall and exits through a discharge passage constituted by the other tubular leg of the Y-strainer body, along an axis at an angle to the axis of the screen containing element. The above described method of fabricating Y strainers unit is exceedingly expensive, by reason of its time consuming nature and the non-uniformity and unreliability of its results. Extremely careful inspection and testing of the welded body joint are absolutely necessary in each unit in order to detect faulty units, which occur quite frequently. Moreover, the flow of the fluid undergoes substantial deflection in passing through the Y-structure and is often destructive to the strainer screen, due to impingement with the latter of foreign or suspended matter traveling at considerable velocity in the stream of fluid.

It is therefore one of the objects of the present invention to provide a strainer element adapted to perform all of the functions of the present conventional Y-strainer, but which is capable of being manufactured at a fraction of its cost by a procedure which eliminates all of the difficulties of assembling the above-mentioned, conventional, build-up Y structure.

Another more specific object of the invention is to provide a Y-strainer housing or body including a single hollow chamber member fabricated of standard tubular metal or similar rigid stock, which member is associated in a novel manner with a pair of like, preformed, angled inlet and discharge fittings in a very simple and inexpensive manner and which performs all of the functions of the conventional, relatively expensive and complicated Y-strainer body in an improved fashion.

It is still a further object of the invention to provide an improved, built-up Y-strainer and a novel method of fabricating the same from a standard cylindrical, tubular element and a pair of like, pre-formed, hollow inlet and discharge fittings, in which said fittings are associated respectively with a closed end and side wall of said tubular member in such manner that the inlet and discharge axes of said strainer are aligned with one another, due to the complemetary, angled relationship of said hollow fittings to one another.

Yet another object is to provide a fluid strainer of the foregoing character having improved provisions to prevent damage or clogging of the internal screen thereof by the impingement of rapidly flowing suspended matter in the fluid stream, yet which insures an absolute minimum of deflection of the flowing stream, in traversing the strainer, from a straight line of flow.

The foregoing statements are indicative in a general way of the nature of the invention, but other and more specific objects will be apparent to those skilled in the are upon a full understanding of the construction and operation of the device.

A single embodiment of the invention is presented herein for purpose of illustration, but it will be appreciated that the invention is susceptible of incorporation in other modified forms coming equally within the scope of the appended claim.

In the drawing,

Fig. 1 is a longitudinal, vertical section through the axis of a strainer in accordance with the present invention, taken along line 1—1 of Fig. 2, illustrating the manner in which the tubular body thereof is associated and assembled with pre-formed angled inlet and discharge fittings, and also illustrating the manner in which the tubular mesh screen of the strainer is disposed relative to said fittings and with an auxiliary perforated inlet member in order to protect said screen; and Fig. 2 is a view in transverse section through the above structure, along a line corresponding generally to section line 2—2 of Fig. 1.

Referring to the drawing, the strainer of the present invention is generally designated by reference numeral 10. It comprises a chambered body 11 in the form of an elongated length of a standard cylindrical metal tube stock defining a strainer chamber 12 internally thereof. One end of the body 11 is covered by a closure assembly, generally designated 13. This assembly comprises an annular clamp ring 14 welded externally on the body 11 adjacent its end extremity and a flanged cap forging 15 which is secured to the aforesaid ring 14 by a plurality of clamping screws 16. A sealing gasket 17 of compressible material is disposed in an annular groove in said cap and compressed thereby against the adjacent edge of body 11 and clamp ring 14, thereby to effectively seal the unit against leakage to the exterior at this zone. Cap 15 may be readily removed for internal cleaning or servicing of the strainer without necessitating removal of the latter from a fluid handling line in which it is mounted.

Cap 15 is centrally recessed at 18 to provide a seat for one end of a coil spring 19. This spring bears against a flanged, perforated lower end plate 20, in a groove 20' of which plate the lower edge of the elongated, somewhat tapered, tubular strainer screen 21 is received and clamped. Screen 21 is formed of one or more layers of wire mesh or other equivalent reticulated or foraminated screening material, generally designated 21', adapted to pass the fluid being treated but to restrain any foreign matter, suspended material, or other like bodies which it is desired to remove from the stream traversing the strainer. The tapered screen 21 is reinforced and rigidified at the upper end by means of a radially flanged inlet ring 22 soldered or otherwise secured thereon. Ring 22 bears against a centrally recessed portion of the upper, centrally apertured closure cap 23, which is snugly fitted around the upper extremity of the strainer body 11.

The central aperture 23' of cap 23 is of appropriate size to receive an angled inlet fitting 24, which fitting is appropriately soldered in leak-proof relation to the cap to discharge internally of the body 11 and tubular screen 21 in the direction of their common axis.

An angled discharge fitting 25 of the same size and shape as the inlet fitting 24 is telescoped in an outwardly flanged side opening 26 in the cylindrical wall of the tubular strainer body 11, being soldered at the joint to prevent leakage from the body. These fittings are interchangeable, and their particular complementary angled and coplanar relationship to one another and to the axis of strainer body 11 constitute an important feature of the invention.

The discharge fitting 25 curves upwardly and forwardly, discharging along a horizontal axis which is coincident with the inlet axis of upwardly and rearwardly inclined inlet fitting 24. In the illustrated embodiment, the respective intake and discharge axes of fittings 24, 25 are curvedly angled at 45° and said fittings are disposed normal to the cap 24 and to the cylindrical body wall respectively, in order to effect the aforesaid, coaxial disposition of their inlet and discharge extremities. This enables the strainer to be directly coupled in a horizontal straight fluid flow line with the strainer body depending beneath said line, in the fashion illustrated in Fig. 1. However, the angles of said individual fittings might be other than equal 45° angles, so long as the sum of said respective angles totals 90°. Due to this provision and to the opposite, complementary disposition of the fittings relative to strainer body 11, the coaxial intake and discharge of the fluid to be treated is made possible.

It occurs in some installations that the flowing stream of fluid to be strained contains a relatively high percentage of foreign or suspended bodies which are of comparatively large size, or are somewhat hard or abrasive in character. When these strike the unprotected strainer screen 21 at considerable velocity they tend to cause wear or tearing of the latter after a relatively short period of use. I therefore overcome this possibility by telescoping a cylindrical protector sleeve 28 in the discharge end of the inlet fitting 24. Sleeve 28 is perforated over its area with $\frac{1}{32}$" holes 29 disposed in relatively close spacing for example $\frac{1}{32}$" to $\frac{1}{16}$". The sleeve which is the equivalent of an extension of fitting 24, projects from that fitting sufficiently to insure that all suspended matter in the stream will be subjected to its baffling action in passing between fittings 24 and 25.

It is advantageous that the flow of fluid to be strained make a very gradual turn from the discharge end of inlet fitting 24, through tubular projector sleeve 28 and screen 21, into the intake side of discharge fitting 25, as indicated by arrows in Fig. 1, i. e., without an abrupt change of direction. The gradually angled shape of fittings 24, 25 carries out this principle to produce an absolute minimum of turbulence of flow in a unit of this type. The perforated protector sleeve 28 has little effect in diverting this generally unidirectional flow at the adjacent ends of fittings 24 and 25, its primary action being to preliminarily baffle the great majority of bodies traveling with the moving stream. It thereby greatly prolongs the life of screen 21.

The component parts of the above strainer are exceedingly simply and inexpensive. The operations involved in assembling and securing said components to one another as a built-up unit are equally simple, being rapidly, efficiently and inexpensively performed by mass production methods. The result is a leak-proof strainer structure having all of the capabilities of the conventional, built-up Y-type strainer, plus further advantages of its own, and which is produced at a fraction of the cost of production of the latter.

I claim:

A strainer structure comprising a tubular body having an inlet opening at one axial end thereof and a lateral discharge opening in the side wall thereof, an angled, tubular inlet fitting distinct from but secured to said body to discharge through said inlet opening, said fitting having an inlet leg disposed at an angle to the axis of said body and being positioned to discharge to the interior of said body in a direction axially of the same, an angled, tubular outlet fitting distinct from but secured to said body in communication with said discharge opening, a tubular foraminated screen member disposed in said body in coaxial relation to the discharge portion of said inlet fitting, said screen member extending in an axial direction past said lateral discharge opening of the body, said member being traversed by fluid flowing through said inlet fitting, said discharge fitting having a discharge leg positioned externally of said body to discharge in alignment with the inlet leg of said inlet fitting, said respective fittings being separate and distinct from one another and being separately applied to said body, a laterally flanged closure cap applied across the axial end of said body opposite said inlet opening, a clamping member externally secured to said body inwardly of said cap, clamping elements coacting with said cap and clamping member to maintain said cap in axially engaged, sealing relation to said last named end of said body, said screen member having an end plate in fixed relation to the end thereof adjacent said cap, and a spring acting between said cap and end plate to urge said screen member in the direction toward the inlet opening to said body.

JOSEPH A. PALCER.

References Cited in the file of this patent

UNITED STATES PATENTS

| Number | Name | Date |
|---|---|---|
| 1,062,793 | Pendleton | May 27, 1913 |
| 1,645,364 | Weaver | Oct. 11, 1927 |
| 2,028,520 | Phillips | Jan. 21, 1936 |

FOREIGN PATENTS

| Number | Country | Date |
|---|---|---|
| 539,425 | Great Britain | Sept. 10, 1941 |